United States Patent
Hwang et al.

(10) Patent No.: US 8,072,170 B2
(45) Date of Patent: Dec. 6, 2011

(54) MOTOR CONTROLLER OF AIR CONDITIONER

(75) Inventors: Sun Ho Hwang, Changwon-si (KR); Han Su Jung, Changwon-si (KR); Chung Hun Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 531 days.

(21) Appl. No.: 12/292,477

(22) Filed: Nov. 19, 2008

(65) Prior Publication Data

US 2009/0146593 A1    Jun. 11, 2009

(30) Foreign Application Priority Data

Nov. 20, 2007    (KR) .................. 10-2007-0118732

(51) Int. Cl.
*H02H 7/09* (2006.01)

(52) U.S. Cl. .................. 318/504; 318/400.3; 318/479; 361/33

(58) Field of Classification Search .............. 318/400.3, 318/504, 720–724, 478, 479; 361/23, 33
See application file for complete search history.

(56) References Cited

U.S. PATENT DOCUMENTS

| | | | | |
|---|---|---|---|---|
| 4,039,914 A | * | 8/1977 | Steigerwald et al. | 318/375 |
| 4,666,020 A | * | 5/1987 | Watanabe | 187/290 |
| 4,751,397 A | * | 6/1988 | Ide | 307/31 |
| 5,663,627 A | * | 9/1997 | Ogawa | 318/803 |
| 5,712,540 A | * | 1/1998 | Toda et al. | 318/46 |
| 6,075,328 A | * | 6/2000 | Notohara et al. | 318/400.09 |
| 6,244,061 B1 | * | 6/2001 | Takagi et al. | 62/229 |
| 6,687,139 B2 | * | 2/2004 | Tanikawa et al. | 363/37 |
| 7,791,309 B2 | * | 9/2010 | Hwang et al. | 318/807 |

* cited by examiner

*Primary Examiner* — Bentsu Ro (74) *Attorney, Agent, or Firm* — McKenna Long & Aldridge LLP

(57) ABSTRACT

The present invention relates to a motor controller for air conditioner including a converter having at least one switching element for converter, the converter converting AC utility power into DC power by a switching operation of the switching element; an inverter having at least one switching element for inverter, the inverter converting the DC power into prescribed AC power by a switching operation of the switching element and driving a three-phase motor; a microcomputer outputting a converter switching control signal that controls the switching element for converter; and a dc terminal signal generator detecting a dc terminal voltage that is applied across an dc terminal of the converter to sequentially generate a pulse type dc terminal signal, and insulating the dc terminal from the microcomputer. The present invention may sequentially generate a dc terminal signal and simultaneously insulate the dc terminal from the microcomputer, thus making it possible to improve the stability of the motor controller.

16 Claims, 6 Drawing Sheets

MOTOR CONTROLLER OF AIR CONDITIONER

CROSS-REFERENCE TO RELATED APPLICATION

This application claims the benefit of Korean Patent Application No. 10-2007-118732, filed on Nov. 20, 2007, which is hereby incorporated by reference in its entirety as if fully set forth herein.

BACKGROUND OF THE INVENTION

1. Technical Field

The present invention relates to a motor controller for an air conditioner, and more specifically to a motor controller which sequentially generates a dc terminal signal and simultaneously insulates a dc terminal from a microcomputer.

2. Background Art

Air conditioners are generally arranged in a certain space, such as rooms, living rooms, offices, and stores, to adjust the temperature, moisture, clearness, and air flow to maintain inner environment clean and fresh.

An air conditioner may be commonly classified into an integral type and a stand-alone type. Both types are the same in their functions. In the integral type air conditioner, however, a cooling function has been integrated with a heating function, and the air conditioner is mounted on the wall or window. On the contrary, the stand-alone type air conditioner includes an indoor unit and an outdoor unit that are provided separately from each other. The indoor unit is located indoors for providing heating and cooling. The outdoor unit is located outdoors for heat dissipation and compression. The indoor unit is coupled with the outdoor unit via a refrigerant pipe.

An air conditioner includes a motor used for a compressor or fan, and a motor controller for driving the motor. A typical motor controller controls driving of such a motor by converting AC utility power into DC power and then converting the DC power into prescribed AC utility power with a prescribed voltage using an inverter.

A malfunction of the motor controller may damage circuit elements included in the motor. Therefore, a number of approaches have been considered to prevent such a malfunction.

SUMMARY OF THE INVENTION

An feature of the present invention is to provide a motor controller for an air conditioner and a motor control method capable of simply determining whether there is an error in the motor controller from a current offset detected.

A motor controller for air conditioner according to an exemplary embodiment of the present invention includes a converter having at least one switching element for converter, the converter converting AC utility power into DC power by a switching operation of the switching element; an inverter having at least one switching element for inverter, the inverter converting the DC power into prescribed AC power by a switching operation of the switching element and driving a three-phase motor; a microcomputer outputting a converter switching control signal that controls the switching element for converter; and a dc terminal signal generator detecting a dc terminal voltage that is applied across an dc terminal of the converter to sequentially generate a pulse type dc terminal signal, and insulating the dc terminal from the microcomputer.

A motor controller for air conditioner according to an exemplary embodiment of the present invention includes a converter having at least one switching element for converter, the converter converting AC utility power into DC power by a switching operation of the switching element; an inverter having at least one switching element for inverter, the inverter converting the DC power into prescribed AC power by a switching operation of the switching element and driving a three-phase motor; a microcomputer outputting an inverter switching control signal that controls the switching element for inverter; and a dc terminal signal generator detecting a dc terminal voltage that is applied across an dc terminal of the converter to sequentially generate a pulse type dc terminal signal, and insulating the dc terminal from the microcomputer.

The motor controller according to exemplary embodiments of the present invention may detect a dc terminal voltage corresponding to an output terminal of a converter to sequentially generate a pulse-type dc terminal signal and simultaneously insulate a dc terminal from a microcomputer, thus improving the stability of the motor controller.

DETAILED DESCRIPTION OF THE PREFERRED EMBODIMENTS

Hereafter, exemplary embodiments of the present invention will be described in a more detailed manner with reference to the accompanying drawings.

Figure 1:
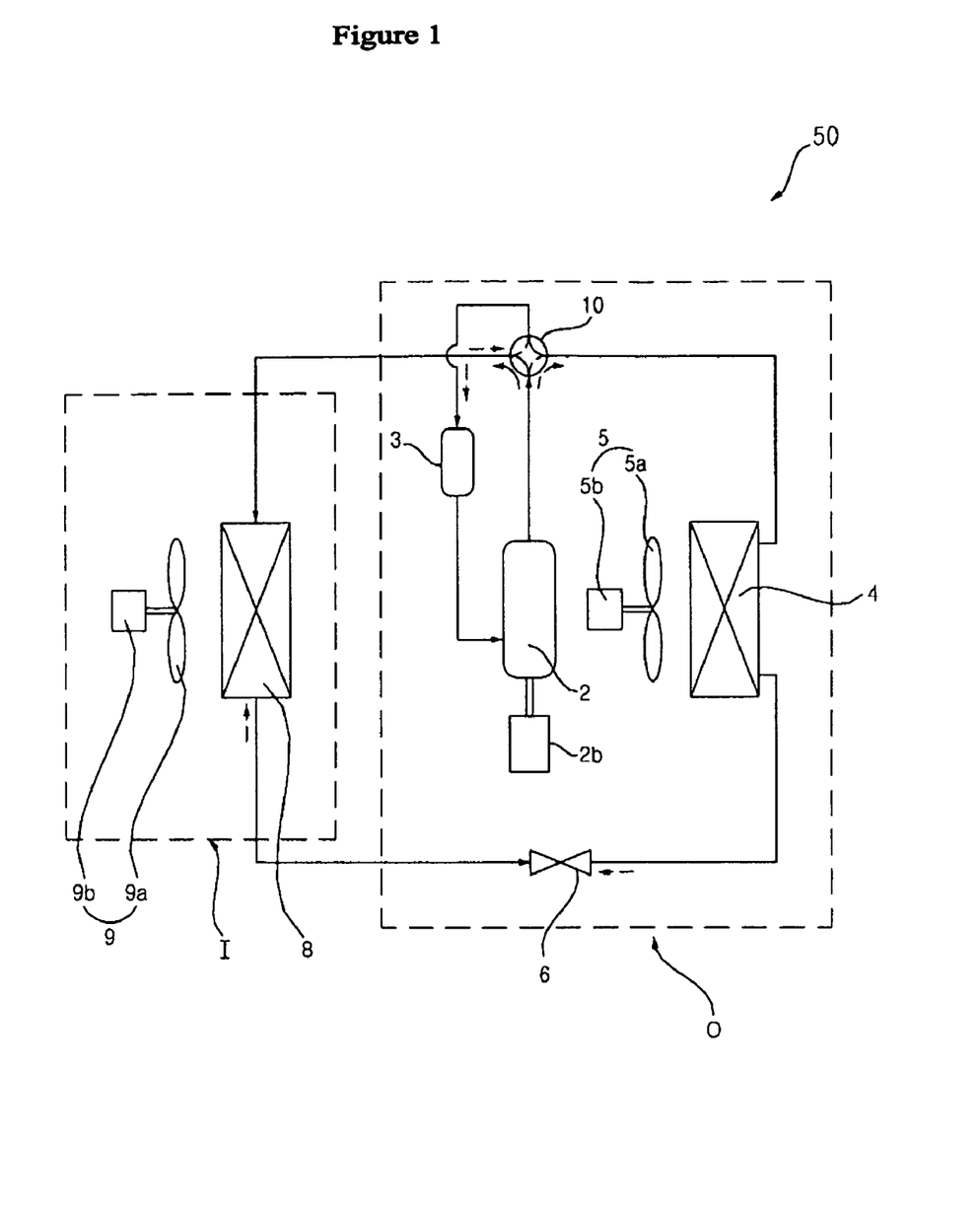
FIG. 1 is a schematic view illustrating an air conditioner according to an exemplary embodiment of the present invention.

FIG. 1 is a schematic view illustrating an air conditioner according to an exemplary embodiment of the present invention.

Referring to FIG. 1, the air conditioner 50 includes an inner unit I and an outdoor unit O.

The outdoor unit O includes a compressor 2, a first motor 2b for compressor, an outdoor heat exchanger 4, an outdoor air blower 5, an expander 6, a cooling/heating switching valve 10, and accumulator 3. The compressor 2 compresses coolant. The first motor 2b drives the compressor 2. The outdoor heat exchanger 4 dissipates the heat emanating from the compressed coolant. The outdoor air blower 5 includes an outdoor fan 5a located at a side of the heat exchanger 4 to promote the heat dissipation of the coolant and a second motor 5b to rotate the outdoor fan 5a. The expander 6 expands the compressed coolant. The cooling/heating switching valve 10 switches a flow path of the compressed coolant into another. The accumulator 3 stores vaporized coolant for a moment to eliminate moisture and unwanted materials, and supplies the coolant with constant pressure to the compressor 2.

The inner unit I includes an inner heat exchanger 8 and an inner air blower 9. The inner heat exchanger 8 is located indoors to perform cooling/heating. The inner air blower 9 includes an inner fan 9a located in a side of the inner heat exchanger 8 to promote the heat dissipation of the coolant, and a third motor 9b to rotate the inner fan 9a.

There could be provided at least one inner heat exchanger 8. The compressor 2 may be at least one of an inverter compressor and a constant-velocity compressor. The air conditioner 50 may be configured as a cooler for cooling, or as a heat pump for cooling or heating.

A motor associated with the motor controller for the air conditioner according to the exemplary embodiment of the present invention may be the motors 2b, 5b, and 9b for operating the outdoor fan, the compressor, and the inner fan, respectively.

Figure 2:
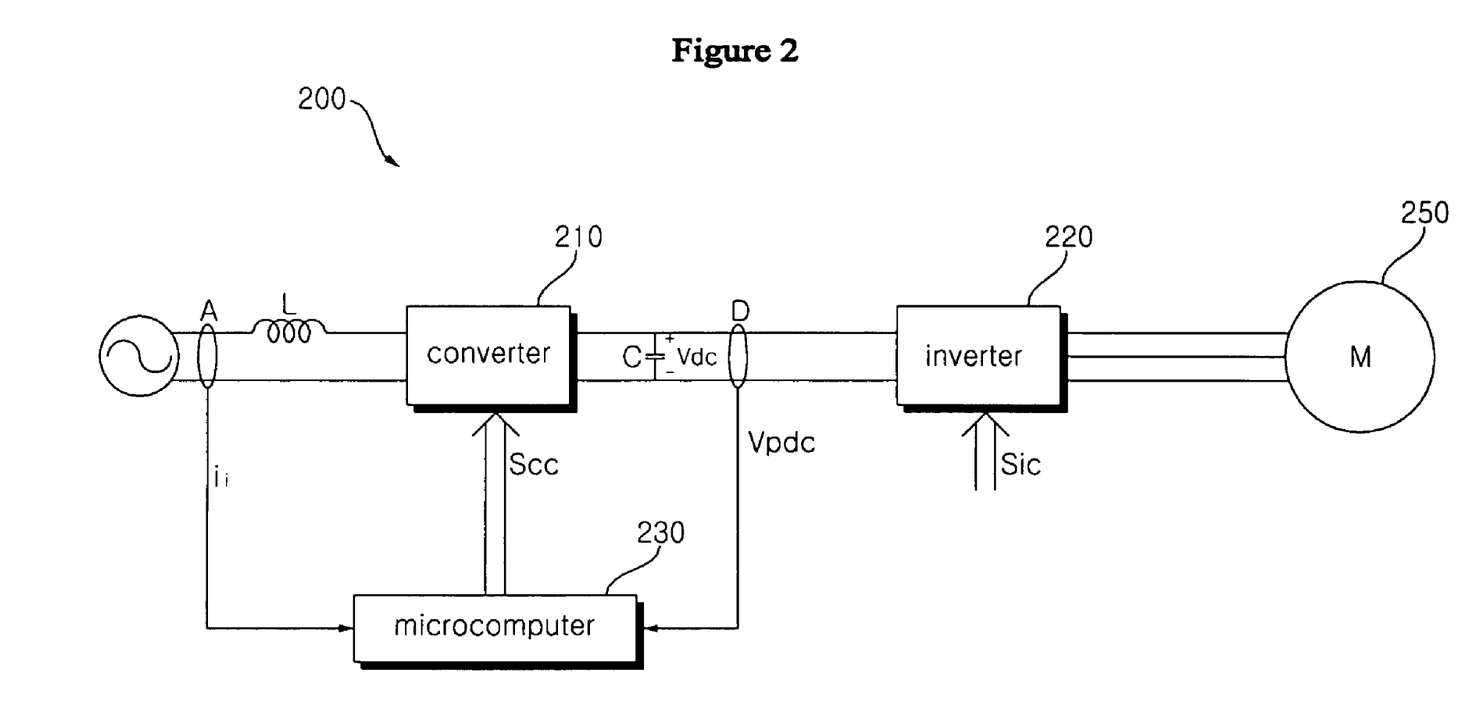
FIG. 2 is a block diagram illustrating a motor controller for an air conditioner according to an exemplary embodiment of the present invention.

FIG. 2 is a block diagram illustrating a motor controller for an air conditioner according to an exemplary embodiment of the present invention.

Referring to FIG. 2, the motor controller 200 includes a converter 210, an inverter 220, a microcomputer 230, and a dc terminal signal generator D.

The motor controller 200 may further include a reactor L, a smoothing capacitor C, and an input current detecting means A.

The reactor L is arranged between an AC utility power source and the converter 210 to perform boosting. The reactor L may also limit harmonics generated during the high-speed switching of the converter.

The converter 210 converts the AC utility power outputted from the reactor L into DC power and outputs the converted DC power. Although a single-phase AC power source has been exemplified as the AC utility power source in FIG. 2, the present invention is not limited thereto. For example, a three-phase AC power source may be used as the AC utility power source.

The inner configuration of the converter 210 may be modified depending on what type of AC utility power source is used. For example, in case of a single-phase AC power source, a half-bridge type converter may be used for the converter 210, which includes two switching elements and four diodes, and in case of a three-phase AC power source, the converter 210 may include six switching elements and six diodes. The converter 210 includes plural switching elements and performs boosting, power factor correcting, and DC power converting by a switching operation.

The smoothing capacitor C is connected to an output terminal of the converter 210. The smoothing capacitor C serves to smooth the converted DC power outputted from the converter 210. Hereinafter, the output terminal of the converter 210 is referred to as "dc terminal" or "dc link terminal". The smoothed DC power is applied to the inverter 220.

The dc terminal generator D detects a voltage applied across the dc terminal (hereinafter, referred to as "dc terminal voltage") to sequentially generate a pulse type dc terminal signal Vpdc. The dc terminal voltage Vdc is a DC voltage, the one which has been converted from AC utility power by the converter 210 and stored at the smoothing capacitor C. The dc terminal generator D detects and splits the dc terminal voltage Vdc to output a pulse type dc terminal signal Vpdc to the microcomputer 230.

The dc terminal signal generator D insulates the dc terminal from the microcomputer 230. The microcomputer 230 operates at a low voltage (within 15 volts), and the dc terminal has a voltage potential of about several hundred volts. The dc terminal signal generator D insulates the microcomputer 230 from the dc terminal to block the application of a high voltage to the microcomputer 230 in order to prevent the microcomputer 230 from being damaged.

Detailed description of the dc terminal signal generator D will be given later with reference to FIG. 3.

The microcomputer 230 outputs a converter switching control signal Scc that controls the switching elements included in the converter. For this purpose, the microcomputer 230 receives the pulse type dc terminal signal Vpdc and input current ii to generate the converter switching control signal Scc. The converter switching control signal Scc may be a PWM switching control signal.

Detailed description of the microcomputer 230 will be given later with reference to FIG. 4.

The inverter 220 includes plural switching elements for inverter, and converts the smoothed DC power into three-phase AC power having a prescribed frequency by Ons/Offs of the switching elements. More specifically, the inverter 220 includes total three pairs of switching elements, each pair consisting of an upper switching element and a lower switching element connected in series with the upper switching element, the three pairs connected parallel with each other.

The three-phase AC power outputted from the inverter 220 is applied to each terminal of the three-phase motor 250. The three-phase motor 250 includes a stator and a rotator, wherein the rotator rotates when the AC power is applied to each terminal of the three-phase motor 250 connected to coils wound in the stator. The three-phase motor 250 may include a variety of motors, such as an induction motor, a BLDC motor and, a synRM motor.

The input current detecting means A detects an input current ii. The input current detecting means A may be located between the three-phase AC power source and the converter 210, and the input current detecting means A may include a current sensor, a current transformer (CT), and a shunt resistor for current detection The detected input current ii is inputted to the microcomputer 230 to generate the converter switching control signal Scc.

Although not shown in drawings, the motor controller 200 may further include an output current detecting means for detecting an output current flowing in the motor 250. The detected output current is used to generate an inverter switching control signal Sic that is a switching control signal for PWM. The inverter switching control signal Sic may be generated from a microcomputer similar to the microcomputer 230 or a separate microcomputer different from the microcomputer 230.

Figure 3:
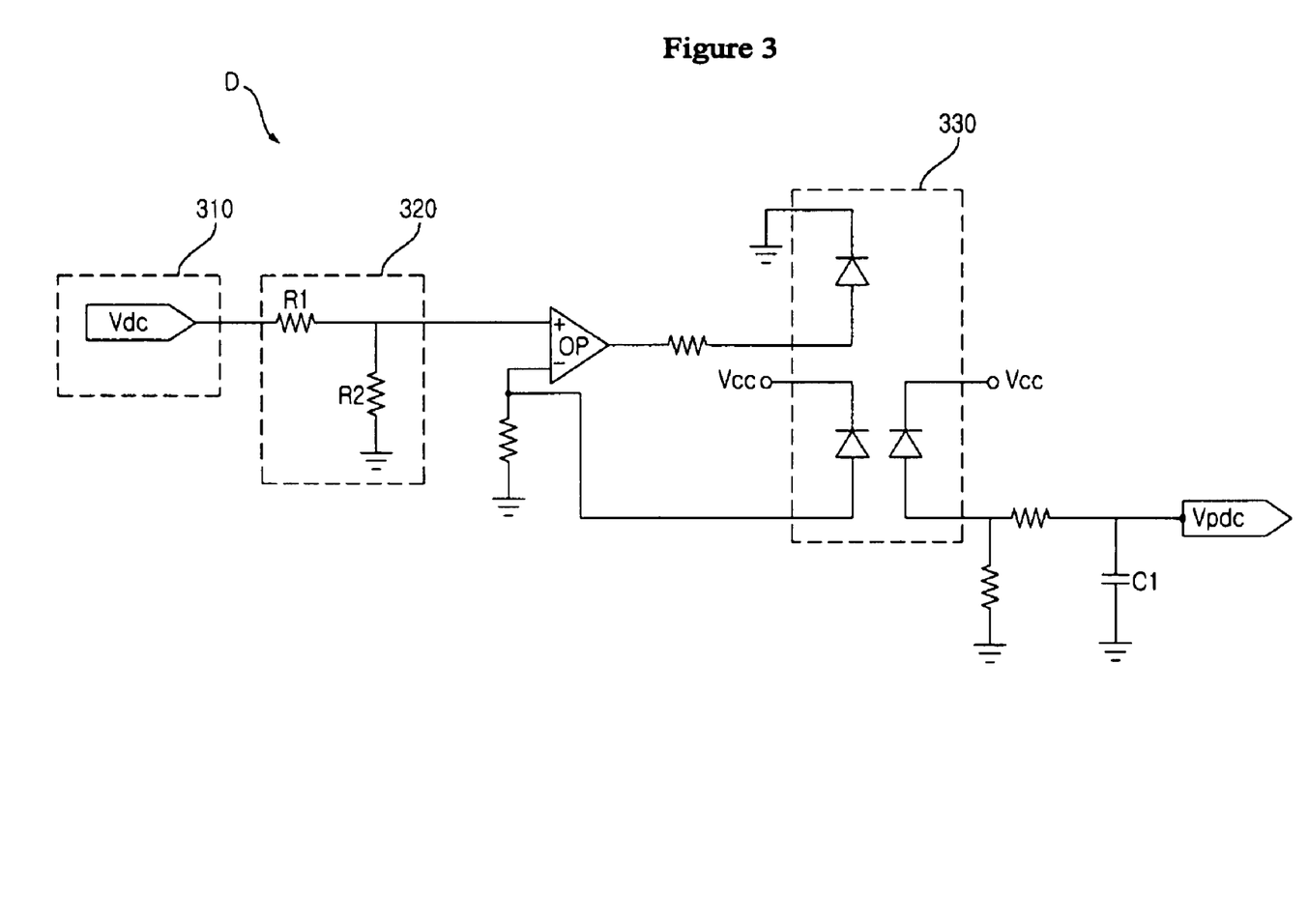
FIG. 3 is a circuit diagram illustrating a dc terminal signal generator shown in FIG. 2.

FIG. 3 is a circuit diagram illustrating a dc terminal signal generator shown in FIG. 2.

Referring to FIG. 3, the dc terminal signal generator D includes a voltage detector 310, a voltage divider 320, and a pulse generator 330.

The voltage detector 310 detects a dc terminal voltage. FIG. 3 shows a case where the dc terminal voltage has been detected. The voltage detector 310 may include a voltage detecting sensor or a resistor for detecting the dc terminal voltage Vdc.

The voltage divider 320 divides the dc terminal voltage of several hundred volts to reduce the dc terminal voltage. For this purpose, resistors may be used. Referring to FIG. 3, a first resistor R1 and a second resistor R2 are used to divide the dc terminal voltage, and a divided voltage that is applied across the second resistor is applied to the pulse generator 330.

The pulse generator 330 sequentially generates a pulse type dc terminal signal Vpdc in the basis of the divided dc terminal voltage, and insulates the dc terminal from the microcomputer 230. For this purpose, the pulse generator 330 may include an opto-coupler.

The opto-coupler generates the dc terminal signal Vpdc whose amplitude is in proportion to the magnitude of the divided dc terminal voltage in a substantially linear relationship. The opto-coupler is an insulating element that insulates its input terminals from its output terminals.

Accordingly, the dc terminal may be insulated from the microcomputer 230, and the microcomputer 230 may be protected. The generated dc terminal signal Vpdc is filtered by a capacitor C1.

An op-amp OP may be provided between the voltage divider 320 and the pulse generator 330 to transmit the divided dc terminal voltage from the voltage divider 320 to the pulse generator 330. The op-amp OP may also insulate its input terminals from its output terminals. It ensures the insulation between the dc terminal and the microcomputer 230.

Figure 4:
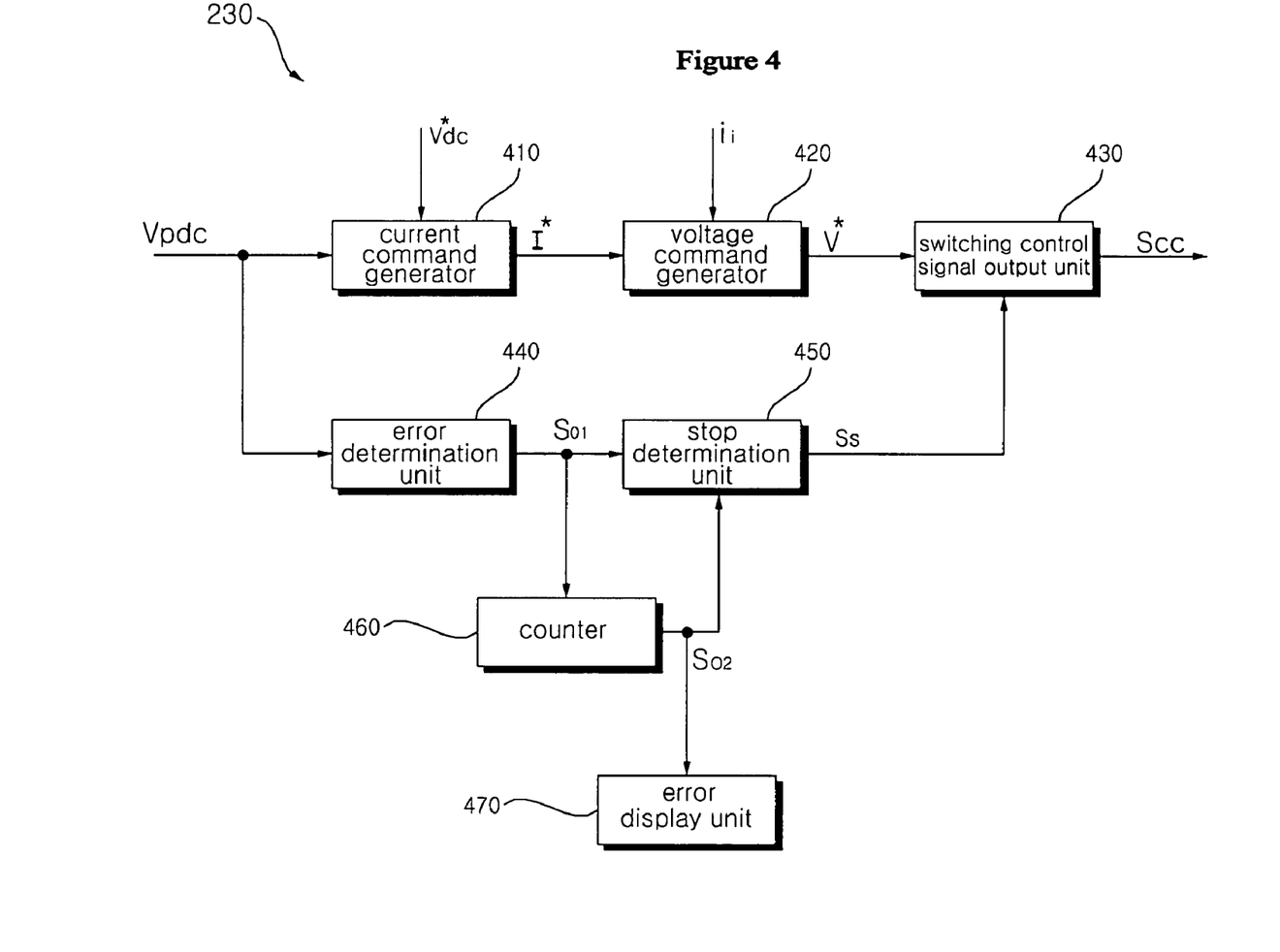
FIG. 4 is a block diagram illustrating a microcomputer shown in FIG. 2.

FIG. 4 is a block diagram illustrating a microcomputer shown in FIG. 2.

Referring to FIG. 4, the microcomputer 230 includes a current command generator 410, a voltage command generator 420, a switching control signal output unit 430, an error determination unit 440, a stop determination unit 450, a counter 460, and an error display unit 470.

The current command generator 410 generates a current command value I* by a PI controller based on the pulse type dc terminal signal Vdc detected at the dc terminal signal generator D and a predetermined dc terminal voltage command value V*dc. The current command value I* may be a command value for the magnitude of a current.

The voltage command generator 420 generates a voltage command value V* by a PI controller based on the current command value I* and the detected input current ii.

The switching control signal output unit 430 outputs a switching control signal Scc to the converter 210 to drive the switching elements included in the converter 210 based on the voltage command value V*. By doing so, the switching elements included in the converter 210 may perform Ons/Offs.

The error determination unit 440 determines whether the dc terminal signal Vpdc detected at the dc terminal signal generator D is an over voltage or a low voltage to determine whether there is an error on the terminals of the converter, and outputs a pausing control signal So1 to the stop determination unit 450 if it is determined there is an error on the terminals of the converter.

The stop determination unit 450 receives the pausing control signal So1 from the error determination unit 440 and outputs a limitation signal Ss to the switching control signal output unit 430 to limit the operation of the switching control signal output unit 430. By doing so, it is limited that the switching control signal output unit 430 outputs the switching control signal Scc. As a consequence, the converter 210 pauses its operation, and this stops the motor 250. The output limit of the switching control signal Scc maintains only for a predetermined period of time, and, after then, the output of the switching control signal Scc resumes, and therefore, the motor 250 restarts its operation.

The counter 460 receives the pausing signal So1 to count the number of pauses of the motor 250. The number of pauses may be stored at a memory included in the counter 460. In case that the number of pauses exceeds a predetermined number, the counter 460 outputs a complete stop control signal So2 to the stop determination unit 450.

The stop determination unit 450 receives the complete stop control signal So2 from the counter 460 and outputs a limitation signal Ss to the switching control signal output unit 430 to limit the operation of the switching control signal output unit 430. The output of the switching control signal Scc is limited by the limitation signal Ss. As a consequence, the converter 210 completely stops its operation, and the motor also completely stops without being reactivated.

The error display unit 470 receives the complete stop control signal So2 from the counter 460 and displays an error. The error display unit 470 may include emission elements such as LEDs.

The dc terminal signal Vpdc detected at the dc terminal signal generator D is a pulse type, continuously detected signal, and therefore, the dc terminal is completely insulated from the microcomputer 230. The converter switching control signal Scc is generated to control the converter 210 based on the dc terminal signal. In addition, it may be possible to determine whether there is an error on the terminals of the converter based on the dc terminal signal Vdpc, and therefore, if it is determined there is an error on the terminals of the converter, the converter 210 and the motor 250 may be controlled to stop their operations.

The current command value I* and the voltage command value V* have been used as the current command value and the voltage command value in FIG. 4 for a case where the AC utility power is single-phase AC power, and therefore, d,q-axis transformed values may be used for the current command value and the voltage command value in case that the AC utility power is three-phase AC power. In the three-phase AC power, the current command value may be replaced by current command value i*d and i*q, the voltage command value by voltage command value v*d and v*q.

Moreover, the input current ii inputted to the voltage command generator 420 may be a d,q axis transformed value.

Figure 5:
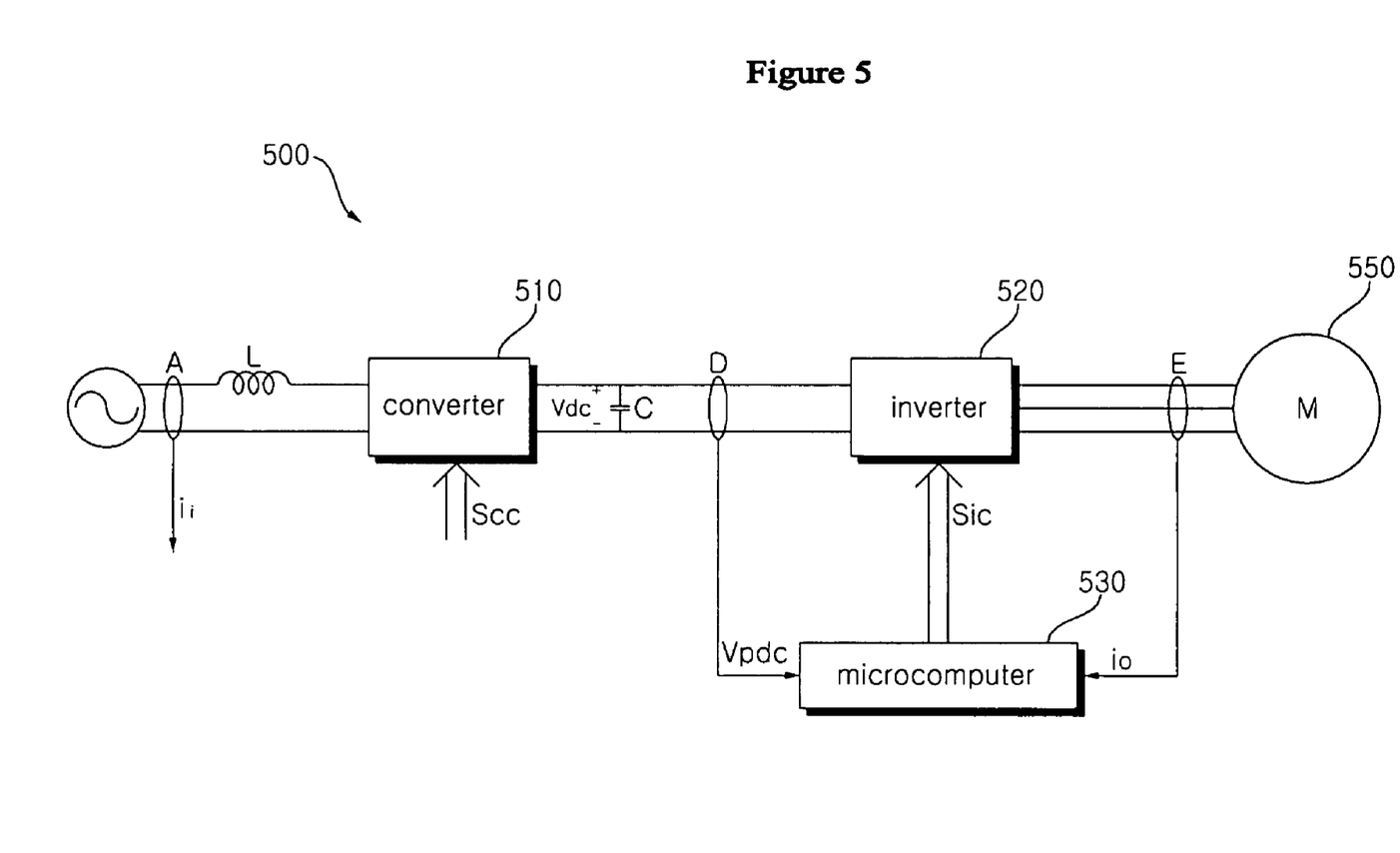
FIG. 5 is a block diagram illustrating a motor controller for an air conditioner according to an exemplary embodiment of the present invention.

FIG. 5 is a block diagram illustrating a motor controller for an air conditioner according to an exemplary embodiment of the present invention.

Referring to FIG. 5, the motor controller 500 includes a converter 510, an inverter 520, a microcomputer 530, and a dc terminal signal generator D.

The motor controller 500 may further include a reactor L, a smoothing capacitor C, an input current detecting means A. and an output current detecting means E.

The motor controller 500 shown in FIG. 5 is similar to the motor controller 200 shown in FIG. 2. That is, the reactor L, the converter 510, the smoothing capacitor C, the dc terminal signal generator D, the inverter 420, and the input current detecting means A are identical in operation to those of FIG. 2. Accordingly, detailed description will focus on the difference between the components in FIG. 2 and the components in FIG. 5.

The output current detecting means E detects an output current io. The output current detecting means E may be located between the inverter 220 and the motor 250, and the output current detecting means E may include a current sensor, a current transformer (CT), and a shunt resistor for current detection The output current detecting means E may be a shunt resistor one end of which is connected to a common terminal of the three lower switching elements included in the inverter. The detected output current io is inputted to the microcomputer 530 to generate an inverter switching control signal Sic that is a switching control signal for PWM.

The microcomputer 530 may output the inverter switching control signal Sic to control the inverter 520. The switching control signal Sic is a switching control signal for PWM, and this is generated based on the output current io detected at the output current detecting means E.

The microcomputer 530 may limit the output of the inverter switching control signal Sic based on the dc terminal signal Vpdc inputted from the dc terminal signal generator D.

A converter switching control signal Scc is generated based on the dc terminal signal Vpdc and the input current ii.

The converter switching control signal Scc may be a switching control signal for PWM, and this may be generated from a microcomputer equal to the microcomputer 230 or a microcomputer separate from the microcomputer 230.

Detailed description of the microcomputer 530 will be given later with reference to FIG. 6.

The dc terminal signal generator D is identical to that shown in FIG. 3.

Figure 6:
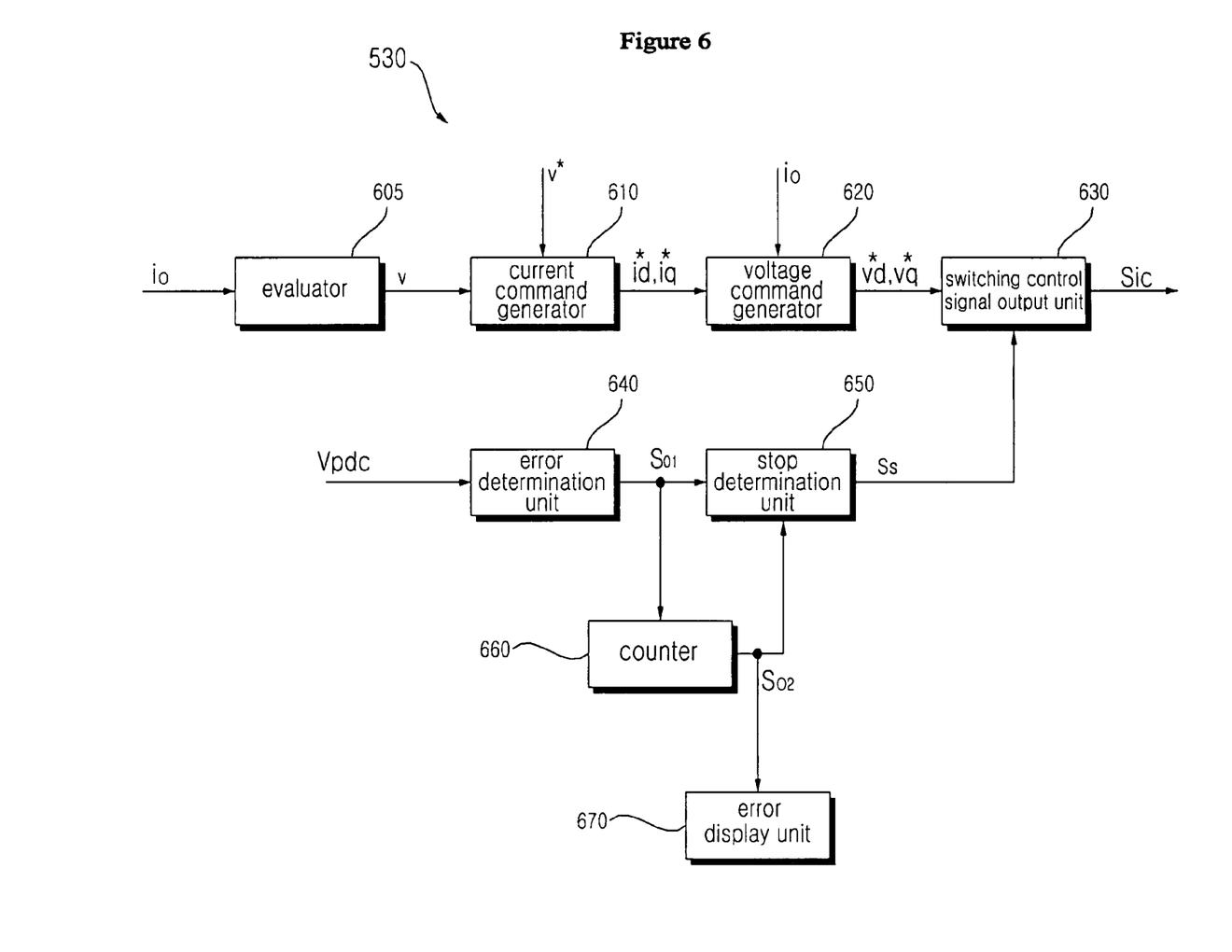
FIG. 6 is a block diagram illustrating a microcomputer shown in FIG. 5.

FIG. 6 is a block diagram illustrating a microcomputer shown in FIG. 5.

Referring to FIG. 6, the microcomputer 530 includes an evaluator 605, a current command generator 610, a voltage command generator 620, a switching control signal output unit 630, an error determination unit 640, a stop determination unit 650, a counter 660, and an error display unit 670.

The evaluator 605 evaluates the speed v of rotator of the motor 250 based on the output current io detected by the output current detecting means E. The speed v may be evaluated by an electrical equation or mechanical equation for the motor 250.

The current command generator 610 generates d,q axis current command values i*d and i*q by a PI controller based on the evaluated speed v and a predetermined speed command value v*.

The voltage command generator 620 generates d,q axis voltage command values v*d and v*q by a PI controller based on the d,q axis current command values i*d and i*q and the detected output current io.

The switching control signal output unit 630 outputs a switching control signal Sic to the inverter 520 to drive the switching elements included in the inverter 520 based on the d,q axis voltage command values v*d and v*q.

By doing so, the switching elements included in the inverter 520 may perform Ons/Offs.

The error determination unit 640 determines whether the dc terminal signal Vpdc detected at the dc terminal signal generator D is an over voltage or a low voltage to determine whether there is an error on the terminals of the inverter, and outputs a pausing control signal So1 to the stop determination unit 650 if it is determined there is an error on the terminals of the inverter.

The stop determination unit 650 receives the pausing control signal So1 from the error determination unit 640 and outputs a limitation signal Ss to the switching control signal output unit 630 to limit the operation of the switching control signal output unit 630. By doing so, it is limited that the switching control signal output unit 630 outputs the switching control signal Sic. As a consequence, the inverter 520 pauses its operation, and this stops the motor 550. The motor 550 is reactivated after a predetermined period of time.

The counter 660 receives the pausing signal So1 to count the number of pauses of the motor 550. The number of pauses may be stored at a memory included in the counter 660. In case that the number of pauses exceeds a predetermined number, the counter 660 outputs a complete stop control signal So2 to the stop determination unit 650.

The stop determination unit 650 receives the complete stop control signal So2 from the counter 660 and outputs a limitation signal Ss to the switching control signal output unit 630 to limit the operation of the switching control signal output unit 630. The output of the switching control signal Sic is limited by the limitation signal Ss. As a consequence, the inverter 520 completely stops its operation, and the motor 550 also completely stops without being reactivated.

The error display unit 670 receives the complete stop control signal So2 from the counter 660 and displays an error. The error display unit 670 may include emission elements such as LEDs.

The dc terminal signal Vpdc detected at the dc terminal signal generator D is a pulse type, continuously detected signal, and therefore, the dc terminal is completely insulated from the microcomputer 530. In addition, it may be possible to determine whether there is an error on the terminals of the inverter based on the dc terminal signal Vdpc, and therefore, if it is determined there is an error on the terminals of the inverter, the inverter 520 and the motor 550 may be controlled to stop their operations.

The output current io inputted to the voltage command generator 620 may be a d,q axis transformed value.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

The motor controller for air conditioner may be utilized to sequentially the dc terminal signal and simultaneously insulate the dc terminal from the microcomputer.

What is claimed is:

1. A motor controller for an air conditioner, comprising:
   a converter having at least one switching element, the converter converting AC power into DC power by a switching operation of the switching element;
   an inverter having at least one switching element, the inverter converting the DC power into AC power by a switching operation of the switching element;
   a microcomputer adapted to output a converter switching control signal that controls the switching element of the converter; and
   a DC terminal signal generator adapted to detect a DC terminal voltage that is applied across a DC terminal of the converter to sequentially generate a pulse type DC terminal signal and to insulate the DC terminal from the microcomputer,
   wherein the microcomputer comprises:
   a switching control signal output unit adapted to output the converter switching control signal to the converter;
   an error determination unit adapted to determine whether there is an error based on the DC terminal signal; and
   a stop determination unit adapted to pause an operation of the switching control signal output unit if it is determined there is an error.

2. The motor controller of claim 1, wherein the microcomputer further comprises a counter adapted to count the number of pauses of the operation of the switching control signal output unit.

3. The motor controller of claim 2, wherein the stop determination unit enables an operation of the switching control signal output unit to completely stop if the number of pauses of the operation of the switching control signal output unit is equal to or more than a predetermined number.

4. The motor controller of claim 1, wherein the DC terminal signal generator comprises:
   a voltage detector adapted to detect the DC terminal voltage;
   a voltage divider adapted to divide the detected DC terminal voltage; and a pulse generator adapted to sequentially generate a pulse type DC terminal signal based on the divided DC terminal voltage and to insulate the DC terminal from the microcomputer.

5. The motor controller of claim 4, wherein the pulse generator comprises an opto-coupler.

6. The motor controller of claim 1, wherein the microcomputer further comprises:
a current command generator adapted to generate a current command value based on the DC terminal signal and a DC terminal voltage command value; and
a voltage command generator adapted to generate a voltage command value based on the current command value and an input current inputted from the AC power source, wherein the switching control signal output unit outputs the switching control signal based on the voltage command value.

7. The motor controller of claim 1, wherein the microcomputer further outputs an inverter switching control signal controlling the switching element of the inverter.

8. The motor controller of claim 1, wherein the error is one of an over voltage and a low voltage.

9. A motor controller for air conditioner comprising:
a converter having at least one switching element, the converter converting AC power into DC power by a switching operation of the switching element;
an inverter having at least one switching element, the inverter converting the DC power into AC power by a switching operation of the switching element;
a microcomputer adapted to output an inverter switching control signal that controls the switching element of the inverter; and
a DC terminal signal generator adapted to;
detect a DC terminal voltage that is applied across a DC terminal of the converter, and
sequentially generate a pulse type DC terminal signal; and
an insulator and to insulate the DC terminal from the microcomputer,
wherein the microcomputer comprises:
a switching control signal output unit adapted to output the inverter switching control signal to the inverter;
an error determination unit adapted to determine whether there is an over voltage or low voltage based on the DC terminal signal; and
a stop determination unit adapted to pause an operation of the switching control signal output unit if it is determined there is an error.

10. The motor controller for air conditioner of claim 9, wherein the microcomputer further comprises a counter adapted to count the number of pauses of the operation of the switching control signal output unit.

11. The motor controller of claim 10, wherein the stop determination unit enables the switching control signal output unit to completely stop switching operation if the number of pauses is equal to or more than a predetermined number.

12. The motor controller of claim 9, wherein the DC terminal signal generator comprises:
a voltage detector adapted to detect the DC terminal voltage;
a voltage divider adapted to divide the detected DC terminal voltage; and
a pulse generator sequentially generating a pulse type DC terminal signal based on the divided DC terminal voltage and to insulate the DC terminal from the microcomputer.

13. The motor controller of claim 12, wherein the pulse generator comprises an opto-coupler.

14. The motor controller of claim 9, wherein the microcomputer further comprises:
an evaluator adapted to evaluate a speed of the motor based on an output current flowing in the motor;
a current command generator adapted to generate a current command value based on the evaluated speed and a speed command value; and
a voltage command generator adapted to generate a voltage command value based on the current command value and the output current, wherein the switching control signal output unit outputs the switching control signal based on the voltage command value.

15. The motor controller of claim 9, wherein the microcomputer further outputs a converter switching control signal controlling the switching element of the converter.

16. A motor controller for an air conditioner, comprising:
a converter having at least one switching element, the converter converting AC power into DC power by a switching operation of the switching element;
an inverter having at least one switching element, the inverter converting the DC power into AC power by a switching operation of the switching element;
a microcomputer adapted to output a converter switching control signal that controls the switching element of the converter; and
a DC terminal signal generator adapted to detect a DC terminal voltage that is applied across a DC terminal of the converter to sequentially generate a pulse type DC terminal signal; and
an insulator to insulate the DC terminal from the microcomputer,
wherein the microcomputer comprises:
a switching control signal output unit adapted to output the converter switching control signal to the converter;
an error determination unit adapted to determine whether there is an error based on the DC terminal signal; and
a stop determination unit adapted to pause an operation of the switching control signal output unit if it is determined there is an error.

* * * * *